(No Model.) 2 Sheets—Sheet 2.

E. WRIGHT.
APPARATUS FOR TRANSMITTING AND CONVERTING MOTION.

No. 427,492. Patented May 6, 1890.

Witnesses.

Edward Wright Inventor.
By Chas. H. Burleigh
Attorney

UNITED STATES PATENT OFFICE.

EDWARD WRIGHT, OF WORCESTER, MASSACHUSETTS.

APPARATUS FOR TRANSMITTING AND CONVERTING MOTION.

SPECIFICATION forming part of Letters Patent No. 427,492, dated May 6, 1890.

Application filed February 4, 1890. Serial No. 339,193. (No model.)

*To all whom it may concern:*

Be it known that I, EDWARD WRIGHT, a citizen of the United States, residing at Worcester, in the county of Worcester and State of Massachusetts, have invented certain new and useful Improvements in Apparatus for Transmitting and Converting Motion, of which the following, together with the accompanying drawings, is a specification sufficiently, full, clear, and exact to enable persons skilled in the art to which this invention appertains to make and use the same.

The object of my present invention is to provide an efficient and serviceable mechanism for converting motion, suitable for use in connection with counter-shafts for operating lathes, planers, and similar machines, and for other purposes, said mechanism being adapted for giving reverse action of the shaft (or wheel) by the conjoint action of a system of intermeshing gears, clutches, and clutch-operating devices, which are combined with the shaft and pulley or wheel, as hereinafter explained.

Another object is to provide, in an apparatus of the kind herein described, means for inclosing the gearing within a reservoir of oil or an inclosed chamber embraced within the pulley or wheel.

These objects I attain by mechanism, the nature, construction, and operation of which are explained in the following description, the particular subject-matter claimed being hereinafter definitely specified.

Figure 1:
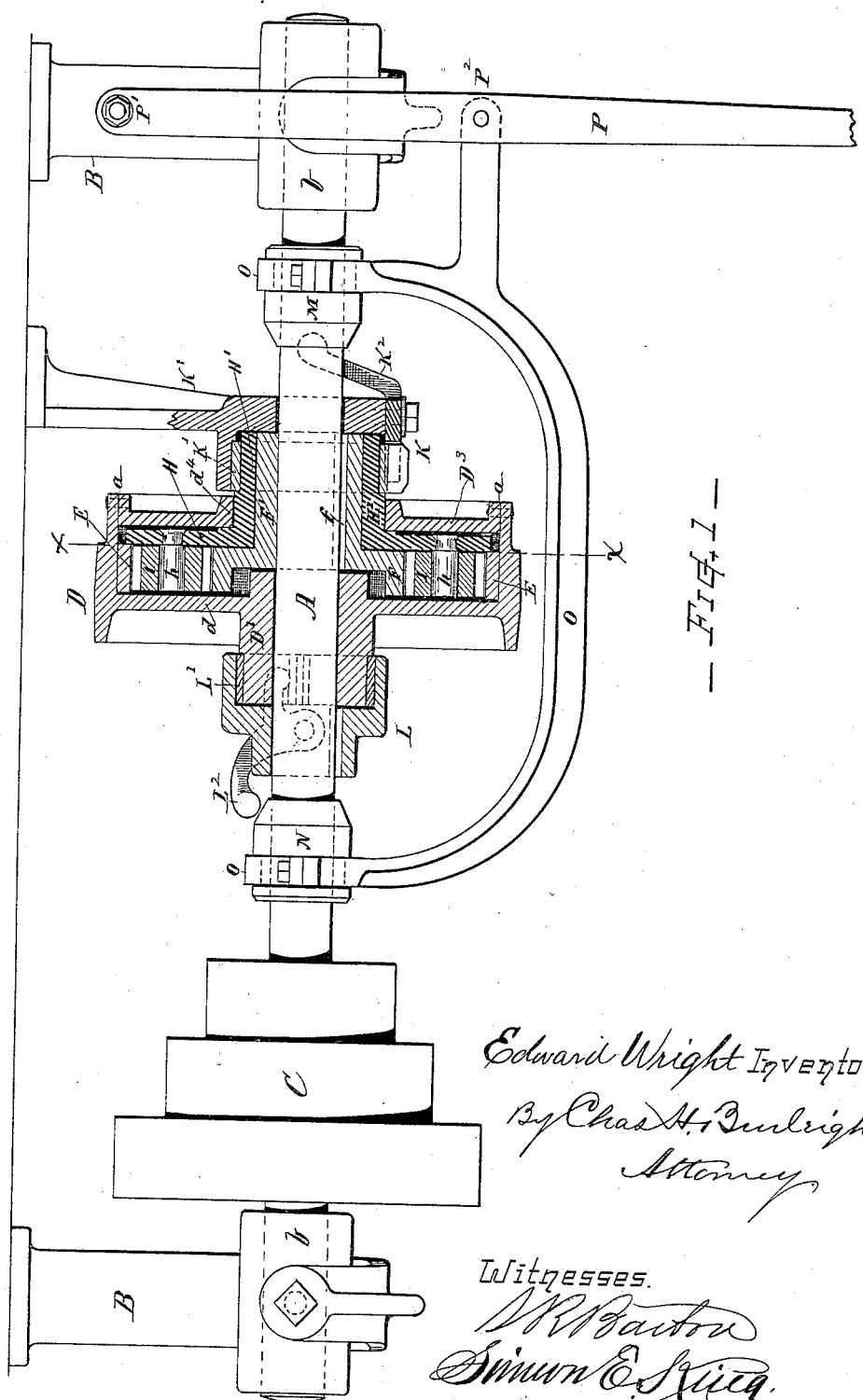
Figure 2:
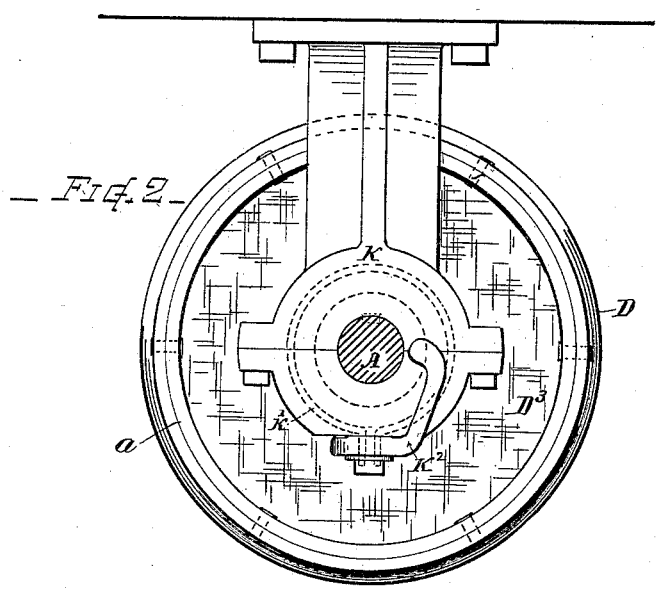
Figure 3:
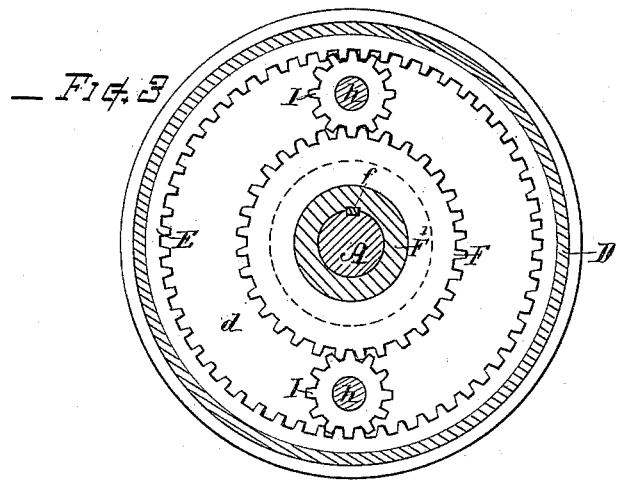

In the drawings, Figure 1 is a sectional view illustrating the nature of my invention. Fig. 2 is a side view of the pulley and the stationary clutch, and Fig. 3 is a section at the position of line $x\ x$ on Fig. 1.

Referring to parts, A denotes the shaft supported to rotate in the bearings $b$ on hangers B, as the counter-shaft for operating a lathe or other machine belted from the cone-pulley C, mounted thereon.

D indicates a pulley or wheel having at one side a hub D', fitted to turn loosely upon the shaft A, and provided with an internally-toothed rim or gear E rigidly fixed thereto; also preferably having a solid web $d$ connecting the hub and rim.

F indicates an externally-toothed gear corresponding with the gear E, but of smaller diameter, and having its hub F' keyed to the shaft A by the spline $f$, or in other equivalent manner, so that said gear and shaft move together.

H indicates a spider, disk, or carrier having its hub H' mounted to turn loosely on the hub F' of the gear F, and carrying axle-studs $h$, whereon are mounted traveler gears or pinions I, that mesh with both the internally-toothed gear E and externally-toothed gear F. Any desired number of the intermediate pinions I may be employed, although in the present instance I have shown but two, that being the best number for ordinary work where the power transmitted is comparatively light.

K indicates a non-rotatable clutch that engages with the hub of the pinion-carrier when thrown into action. Said clutch is best supported by a hanger or connected with any stationary part of the mechanism, so as to hold the parts, when clutched thereby, against rotative action.

L denotes another clutch arranged upon and rotatable with the shaft A, and adapted for engaging the hub D' of the pulley D for connecting and disconnecting said pulley and shaft.

M and N indicate clutch-actuating sleeves or collars that slide on the shaft, and O the shipper-bar, preferably arranged so as to connect the two collars one with the other in such manner that one is moved toward its clutching position as the other is moved away from its clutching position, and vice versa.

P indicates the shipper-lever fulcrumed at P' and connected with the shipper-bar at P², as indicated.

The clutches K and L can, if in any case desired, be made with interengaging teeth, or with any suitable form of engaging devices, but I prefer to employ friction clutching-surfaces. Said clutches are in the present instance made with friction-bands K' L', surrounding the end of the respective hubs H' and D', said bands being held in the body of the clutch, as indicated, and a lever or dog K² L², pivoted thereon, acts to close said friction-band tightly about the hub when the inclined end of the shipper-sleeve is forced beneath the end of the dog-lever, as will readily be understood from the illustration, Fig. 1.

The rim of the wheel D is extended over the carrier-disk H, and an annular plate or disk D³ has its periphery $a$ fitted therein and secured by screws, rivets, or otherwise, while its inner edge $d^4$ has support and bearing upon the hub H' of the carrier, the joint at $d^4$ being close fitted, but revoluble about the hub. This disk D³ supports the pulley-rim at the opposite side from the hub D', so that the pulley will be kept straight on its axis and will not wear rounded at the eye and become loose or run wabbly. Said disk forms one side of the wheel, and, in connection with the web $d$ and peripheral rim, serves as a casing for inclosing the gears, while it also forms a receptacle for containing oil, so that the intermeshing gears and traveler-pinions can constantly run in a body of oil or equivalent lubricating substance. This prevents noise of the gearing, and also keeps the teeth and axis-studs constantly lubricated.

In the drawings, Fig. 1, the shipper is shown at neutral position, or with both clutches out of engagement. By moving the shipper to the right the clutch L is caused to engage with the hub of the wheel, and the shaft A is then rotated by the pulley, in case said pulley is the driver, or vice versa, in case the shaft is the driver. When in this condition, the carrier H and traveler-pinions I move around in unison with the wheel D and shaft A. When the shipper is moved to the left, then the non-rotating clutch K is thrown into engagement with the carrier-hub. This stops the rotation of the carrier, and the axes of the pinions I being thus held at fixed position the power and motion are then transmitted from the wheel D to the shaft A through the train of gearing E, I, and F, the shaft being thereby rotated in an opposite direction to the rotation of the pulley. Thus right-hand or left-hand rotation is afforded by simply shifting the shipper from right to left, or vice versa.

The advantages of this construction are that it makes a strong and durable mechanism, while the gears give a positive and powerful action; also, the parts of the mechanism that would be liable to become clogged with dust and dirt are entirely inclosed and protected, and their wearing-surfaces are abundantly submerged in the oil contained in the chamber within the pulley or wheel.

I am aware that mechanism capable of effecting reverse action has heretofore been employed with counter-shafts; therefore I do not claim the feature of reversal, broadly, as of my present invention.

I claim as my invention herein, to be secured by Letters Patent—

1. The combination, with the pulley or wheel having the internally-toothed gear, the externally-toothed gear, the traveler-pinions meshing with said gears, and the carrier whereon said pinions are mounted, of the annular plate or disk D³, arranged at the side of said wheel and forming therewith an inclosing-casing having an interior chamber adapted as a receptacle for oil, and within which said gears are contained, substantially as and for the purpose set forth.

2. The side plate or disk D³, having its periphery fitted to the rim of the wheel and having a close-running bearing upon the hub of the pinion-carrier at $d^4$, in combination with the pulley or wheel having the oppositely-extended hub D', the gears E and F, the pinion-carrier, and pinions, for the purpose set forth.

3. The combination of the rotatable shaft, the pulley or wheel mounted loose thereon and carrying the internally-toothed gear, the externally-toothed gear fixed to the shaft, the loose-running pinion-carrier mounted on the hub of said gear, the intermediate pinions mounted on axial studs fixed on said carrier, the clutches keyed to the shaft and engaging by a friction-band the hub of the pulley, the non-rotatable clutch engaging by a friction-band on the carrier-hub the clutch-actuating levers, the sliding sleeves on the shaft, and the shipper-bar embracing said sleeves for moving the same and throwing the clutches into and out of action, substantially as set forth.

Witness my hand this 30th day of January, A. D. 1890.

EDWARD WRIGHT.

Witnesses:
 ELLA P. BLENUS,
 EDWARD F. BISCO.